Jan. 16, 1951   R. F. MOZLEY   2,538,028
AUTOMATIC GAIN-CONTROL SYSTEM
Filed June 24, 1947
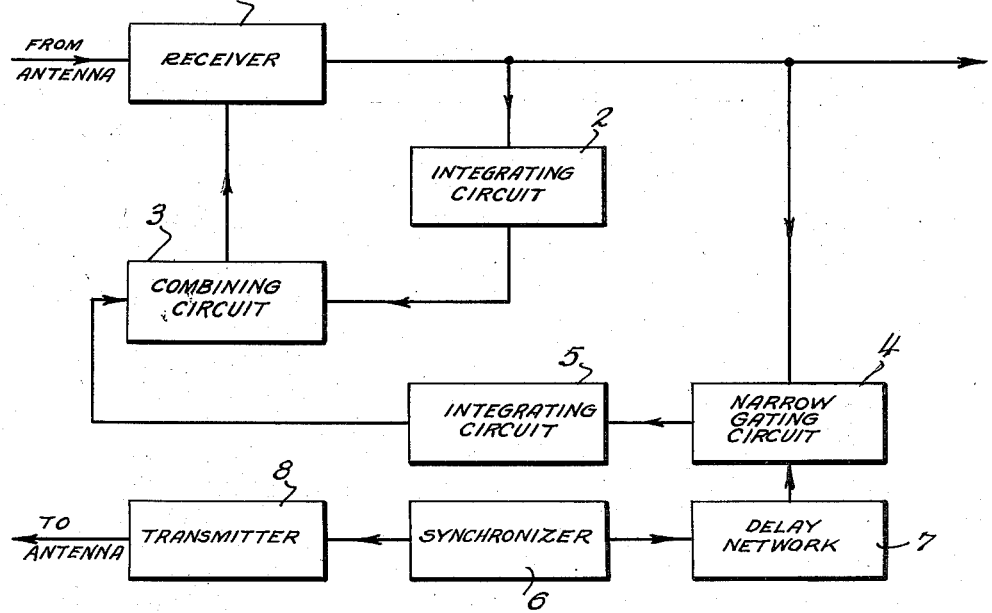
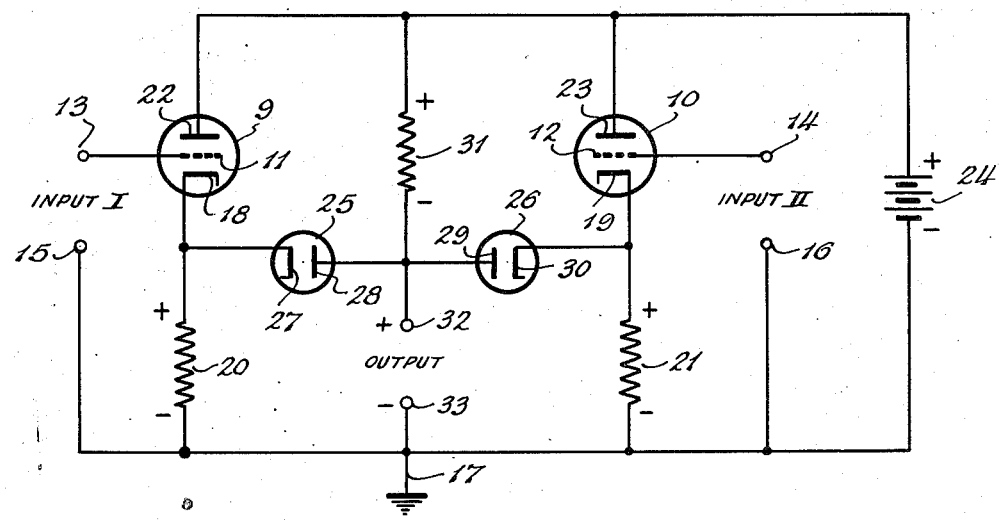
INVENTOR.
ROBERT F. MOZLEY
BY
Paul B. Hunter
ATTORNEY Patented Jan. 16, 1951

2,538,028

UNITED STATES PATENT OFFICE 2,538,028

AUTOMATIC GAIN-CONTROL SYSTEM

Robert F. Mozley, Berkeley, Calif., assignor to The Sperry Corporation, a corporation of Delaware Application June 24, 1947, Serial No. 756,746

7 Claims. (Cl. 250—20)

This invention relates in general to radio detection and ranging or radar apparatus, and more particularly to improved automatic gain-control systems for use in such apparatus. Henceforth in this specification, the expression "AGC system" will be used to denote an automatic gain-control system.

In a radar system, high-powered bursts of electromagnetic energy are transmitted from a directional antenna into space. When any of this energy strikes an object or target, a small part of it is reflected back to the source and picked up by a suitable receiver. The reflected or "echo" signal provides information as to the direction and range or distance of the object causing the reflection.

In general, a radar system has two principal modes of operation. In the first, called "search," the radar beam automatically searches over a selected area for possible targets which show as bright spots on the face of a cathode-ray indicator tube. The term "search" may refer to range as well as direction; that is, the radar system may be adapted not only to sweep a selected area for a possible target, but also to vary its effective range periodically in an attempt to locate the target.

The second mode of operation of a radar system, called "track," is employed after a target has been located. The radar beam is caused to have a direction which continuously intercepts the target regardless of movement thereof and, in addition, the means for providing range information may also automatically adjust itself as the distance from the radar system to the selected target varies.

Due to the wide range of signal strengths to which the receiver in any radar system is subject, it is highly desirable that it be provided with a suitable AGC system. A satisfactory AGC system also aids materially in locking on a target. Arrangements so far proposed have not proved entirely satisfactory, for the reasons stated below.

It has previously been proposed to provide an AGC system which is responsive to the output of the receiver after this output has been subjected to narrow gating for the purpose of discriminating between targets and for minimizing the effects of noise upon the range data. Such an AGC system, however, is responsive only to variations in the signal level, and accordingly the receiver is permitted to operate at full gain when no signal is present. Such operation causes the output of the receiver to be a function of the average noise level, which varies with time and other conditions in a manner which cannot be predicted with accuracy.

Another previous proposal was to make the AGC system responsive to the total output of the receiver. Because of the extremely short time interval occupied by each signal pulse compared with the length of each cyclic period, such an AGC system is effectively responsive only to the noise level as averaged over the period. The gain of the receiver, therefore, will be substantially independent of the strength of the received signal pulses, and there will thus be no appreciable compensation for variations of the incoming signal strength.

Accordingly, it is an object of the present invention to provide an improved AGC system especially adapted for use in pulse receivers, as for example those employed in radar systems of the type capable of searching for and tracking a moving target.

It is another object of the invention to provide an AGC system in which a plurality of separate control voltages are combined in a novel manner to develop a control voltage for application to a pulse receiver.

It is still another object of the invention to provide an arrangement for combining two unidirectional voltages of the same polarity to develop a third unidirectional voltage which is a function of either the larger or the smaller of the first two voltages, depending upon the polarity of these voltages.

It is an additional object of the invention to provide an AGC system especially adapted for use in radar systems, in which the gain of the receiver is regulated, for example, in accordance with the larger of two negative control voltages, one of which is obtained by integrating substantially the entire output of the receiver and the other of which is secured by integrating selected time portions of the receiver output.

The invention in another of its aspects relates to novel features of the instrumentalities described herein for achieving the principal objects of the invention and to novel principles employed in those instrumentalities, whether or not these features and principles are used for the above principal objects or in the same field.

A further object of the invention is to provide improved apparatus and instrumentalities embodying novel features and principles, adapted for use in realizing the above objects and also adapted for use in other fields.

The above and other objects and features of the invention will be better understood by reference to the following description taken in connection with the accompanying drawing, in which like components are designated by like reference numerals and in which:

Fig. 1 is a block diagram of a radar system incorporating an AGC system in accordance with the present invention; and Fig. 2 is a schematic circuit diagram of the combining circuit of Fig. 1.

Referring to Fig. 1, there is shown a pulse receiver 1, to the input of which is connected the radar antenna (not shown). An integrating circuit 2 is connected to the output of receiver 1, and the resultant integrated receiver output signal is supplied to combining circuit 3.

The output of receiver 1 is also passed through a narrow gating circuit 4, the output of which is supplied to an integrating circuit 5 and then to combining circuit 3. The output of combining circuit 3 is supplied to receiver 1 to provide automatic regulation of the gain or amplification thereof.

A synchronizer 6 is provided, and its output is passed through a delay network 7 and used to determine the time position of the narrow gate in unit 4. The output of synchronizer 6 is also utilized to control the emissions of a transmitter 8, the output of which is supplied to an antenna (not shown), which may or may not be identical with the antenna to which receiver 1 is connected.

In operation, transmitter 8 emits short pulses of electromagnetic energy at intervals determined by synchronizer 6. When a portion of this emitted energy is reflected from a target, it is received by receiver 1, which in turn produces an output signal comprising a series of pulses whose time spacing with respect to the corresponding transmitted pulses provides information as to the range of the target. The receiver output also includes a number of noise components. By integrating substantially the entire receiver output signal in integrating circuit 2, a unidirectional voltage is provided which is a function of the average noise level at the receiving antenna. Since the received signal pulses are of relatively extremely short duration, their amplitude has no appreciable effect upon the value of this first unidirectional voltage.

The purpose of unit 4 is so to gate the output of receiver 1 that only the received pulses appear at the output of unit 4. This is achieved by delay network 7, which permits the development of a narrow gate at an adjustable time interval following each transmitted signal pulse. By suitably adjusting the delay time, this gate may be made to coincide with the corresponding received signal pulse. In this manner the output of gating circuit 4 consists almost solely of received signal pulses, and is substantially independent of the noise components in the received signals. This output signal is passed through integrating circuit 5 to provide a unidirectional voltage the value of which is a function of the average amplitude of the received signal pulses, and this second unidirectional voltage, which has the same polarity as the first unidirectional voltage, is combined in unit 3 with the first voltage to produce a third unidirectional voltage adapted to control the gain of receiver 1. The operation of combining circuit 3 is such that its output voltage is a function only of the larger or of the smaller of the two input voltages, depending upon the polarity thereof. In this manner, in the absence of received signal pulses, the gain of the receiver is effectively controlled by the average noise level.

Upon the appearance of received pulses having an amplitude appreciably above the average noise level, however, control of the receiver gain is automatically taken over by these received signal pulses, and thenceforth the gain of the receiver becomes a function of the average value of these pulses.

Referring now to Fig. 2 of the drawing, which shows in detail a combining circuit arranged for use with input voltages of negative polarity relative to ground, there are shown a pair of impedance-changing devices, as for example vacuum tubes 9 and 10 arranged as cathode followers. Control electrodes 11 and 12 respectively of vacuum tubes 9 and 10 are connected respectively to input terminals 13 and 14. Remaining input terminals 15 and 16 are common and may be grounded, as indicated at 17. Cathodes 18 and 19 of vacuum tubes 9 and 10 are connected to ground respectively through resistors 20 and 21. Anodes 22 and 23 of vacuum tubes 9 and 10 are connected together and to the positive terminal of a source of potential 24, the negative terminal of which is grounded as shown.

A pair of rectifier elements, indicated as diodes 25 and 26, are connected back-to-back between cathodes 18 and 19; in this case, cathode 27 of diode 25 is connected to cathode 18 of vacuum tube 9, anodes 28 and 29 respectively of diodes 25 and 26 are connected together, and cathode 30 of diode 26 is connected to cathode 19 of vacuum tube 10. The junction of anodes 28 and 29 is connected through a resistor 31 to the positive terminal of potential source 24. This junction is also connected to an output terminal 32, the remaining output terminal 33 being grounded.

Let it first be assumed that input terminal 13 has substantially the same potential as input terminal 15, and that input terminal 14 has substantially the same potential as input terminal 16. Under this static condition, each of vacuum tubes 9 and 10 draws substantially the same anode current, so that cathodes 18 and 19 have a given positive potential relative to ground. Under this condition relatively small substantially equal currents will flow through diodes 25 and 26, so that output terminal 32 has a positive potential with respect to output terminal 33 which closely approaches the potential of source 24.

Now let it be assumed that input terminal 13 is made negative with respect to input terminal 15, as for example by the application of a unidirectional input voltage. The application of this negative potential to control electrode 11 substantially reduces the current flow through vacuum tube 9 and thus decreases the potential drop across resistor 20. This in turn renders cathode 27 of diode 25 negative with respect to anode 28, so that an appreciable current flows through this diode and resistor 31. This in turn increases the potential drop across resistor 31 and decreases the positive potential of output terminal 32 with respect to output terminal 33. A secondary effect is to entirely cut off diode 26, since its anode 29 is now negative with respect to its cathode 30.

A similar result would be achieved if the potential of input terminal 13 were held constant and that of input terminal 14 were made negative with respect to input terminal 16. In either case, the potential between output terminals 32 and 33 is a function of the larger of the two negative voltages applied respectively between input terminals 13 and 15 and input terminals 14 and 16.

The circuit of Fig. 2 is equally useful when the available input voltages are positive relative to ground. In this case, the circuit constants are so chosen that diodes 25 and 26 are both conducting when the input voltages are both zero. A positive voltage applied either to input terminal 13 or to input terminal 14 causes the corresponding cathode to become increasingly positive, so that the associated diode becomes less conductive. This in turn decreases the potential drop across resistor 31, so that output terminal 32 becomes increasingly positive with respect to output terminal 33. If the applied positive voltage is great enough, the corresponding diode will become entirely non-conducting, so that the output voltage will depend solely upon the value of the other input voltage. Even if neither diode is cut off, the output voltage will be a function chiefly of the smaller of the two positive input voltages.

In some applications, as for example where the output voltage is to be used as the negative bias of one or more amplifying vacuum tubes, it may be desirable to have output terminal 32 become increasingly negative rather than decreasingly positive with respect to ground upon the application of negative input voltages. This result may readily be achieved by removing the ground at point 17, and by returning this point to a point sufficiently negative with respect to ground so that output terminal 32, in the presence of no input voltages, is normally somewhat negative relative to ground. In this manner, the application of a negative input voltage will cause output terminal 32 to become still more negative relative to ground and, if this terminal is connected to the control electrodes of one or more amplifying vacuum tubes, will cause a reduction in their gain or amplification.

Although diodes 25 and 26 are shown in Fig. 2 as separate devices, it will be understood that they may be incorporated in the same envelopes with vacuum tubes 9 and 10 without departing from the present invention. If such combined vacuum tubes are employed it will be apparent that they may be of the type having a single cathode common to both the diode and the triode portions thereof. Alternatively, diodes 25 and 26 may be replaced by other suitable rectifier elements, as for example germanium detectors.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In combination: a receiver adapted to receive pulses of electromagnetic energy, said receiver having a gain control circuit; means for integrating substantially the entire output of said receiver to provide a first unidirectional voltage which is a function of the average level of said entire output; means for selecting portions of the output of said receiver corresponding approximately in time to said received pulses; means for integrating the output of said selecting means to provide a second unidirectional voltage which is a function of the average amplitude of said received pulses; a generator for producing a control voltage proportional to the larger of said first and second unidirectional voltages; and means for connecting said control voltage to said gain control circuit.

2. In combination: a receiver adapted to receive pulses of electromagnetic energy, said receiver having a gain control circuit; means for integrating substantially the entire output of said receiver to provide a first unidirectional voltage substantially proportional to the average level of said entire output; means for selecting portions of the output of said receiver corresponding approximately in time to said received pulses; means for integrating the output of said selecting means to provide a second unidirectional voltage which is substantially proportional to the average amplitude of said received pulses; a generator for producing a control voltage proportional to the smaller of said first and second unidirectional voltages; and means for connecting said control voltage to said gain control circuit.

3. In combination, a transmitter adapted to generate pulses of electromagnetic energy, a receiver adapted to receive pulses of electromagnetic energy, said receiver having a gain control circuit, means for integrating the entire output of said receiver to provide a first voltage, a gating circuit under the control of said transmitter for selecting portions of the output of said receiver corresponding approximately in time to said received pulses, means for integrating the output of said gating circuit for providing a second voltage, a generator for producing a control voltage proportional to the larger of said first and second voltages, and means for connecting said control voltage to said gain control circuit.

4. In combination, a transmitter adapted to generate pulses of electromagnetic energy, a receiver adapted to receive pulses of electromagnetic energy, said receiver having a gain control circuit, means for integrating the entire output of said receiver to provide a first voltage, a gating circuit under the control of said transmitter for selecting portions of the output of said receiver corresponding approximately in time to said received pulses, means for integrating the output of said gating circuit for providing a second voltage, a generator for producing a control voltage proportional to the smaller of said first and second voltages, and means for connecting said control voltage to said gain control circuit.

5. In combination, a receiver adapted to receive pulses of electromagnetic energy, said receiver having a gain control circuit, means for integrating the output of said receiver to provide a first unidirectional voltage, means for selecting portions of the output of said receiver corresponding approximately in time to said received pulses, means for integrating the output of said selecting means for providing a second unidirectional voltage, a source of potential, a control impedance serially connected with said source of potential across said gain control circuit, first and second impedances, first and second unilateral devices respectively connecting said first and second impedances across said gain control circuit, means under the control of said first unidirectional voltage for controlling the flow of current through said first impedance, and means under the control of said second unidirectional voltage for further controlling the flow of current through said second impedance.

6. In combination, a receiver adapted to receive pulses of electromagnetic energy, said receiver having a gain control circuit, means for integrating the output of said receiver to provide a first unidirectional voltage, means for selecting portions of the output of said receiver corresponding approximately in time to said received pulses, means for integrating the output of said selecting means for providing a second unidirectional voltage, a source of potential, a control impedance serially connected with said source of potential across said gain control circuit, a first control means connected across said gain control circuit and under the control of said first unidirectional voltage for controlling the flow of current through said control impedance, and a second control means connected across said gain control circuit and under the control of said second unidirectional voltage for further controlling the flow of current through said control impedance.

7. In combination; a receiver adapted to receive pulses of electromagnetic energy, said receiver having a gain control circuit; means for integrating the output of said receiver to provide a first unidirectional voltage; means for selecting portions of the output of said receiver corresponding approximately in time to said received pulses; means for integrating the output of said selecting means for providing a second unidirectional voltage; a source of potential; first and second impedance-changing devices each having an individual input terminal, an individual output terminal, and a common terminal; means for applying said first and second unilateral voltages respectively between said input terminals and said common terminal with such sense that said input terminals have the same polarity relative to said common terminal; a pair of unilateral devices connected back-to-back between said output terminals; an impedance and a source of potential connected in series between the junction of said unilateral devices and said common terminal; and means interconnecting said junction and said common terminal with said gain control circuit.

ROBERT F. MOZLEY.

REFERENCES CITED

The following references are of record in the file of this patent:

UNITED STATES PATENTS

| Number | Name | Date |
|---|---|---|
| 1,938,742 | Demarest | Dec. 12, 1933 |
| 2,329,048 | Hullegard | Sept. 7, 1943 |
| 2,408,821 | Stearns | Oct. 8, 1946 |
| 2,421,136 | Wheeler | May 27, 1947 |
| 2,422,069 | Bedford | June 10, 1947 |
| 2,426,182 | Lange | Aug. 26, 1947 |
| 2,429,513 | Hansen et al. | Oct. 21, 1947 |
| 2,431,832 | Schlesinger | Dec. 2, 1947 |